United States Patent Office 3,838,082
Patented Sept. 24, 1974

3,838,082
POLYTETRAFLUOROETHYLENE COATINGS CONTAINING WATER SOLUBLE POLYHYDROLYZABLE COMPOUND FOR GLASS FABRICS
David Allen Sauer, Wilmington, Del., assignor to E. I. du Pont de Nemours and Company, Wilmington, Del.
No Drawing. Continuation-in-part of abandoned application Ser. No. 146,837, May 25, 1971. This application May 15, 1972, Ser. No. 253,338
Int. Cl. C08f 45/24
U.S. Cl. 260—29.6 F
9 Claims

ABSTRACT OF THE DISCLOSURE

Coated glass fabric of improved flex life is provided, the coating on the fabric comprising (a) unsintered polytetrafluoroethylene having a specific melt viscosity of at least $1 \times 10^9$ poises at 380° C. and (b) condensation product of polyhydrolyzable compound which is a silane or a compound of tetravalent titanium, zirconium, or tin. The coating can also contain a water repellent additive which prevents water from soaking into the fabric. The coating is present on the glass fabric either as a blend of (a) and (b) or as a basecoat of (b) and topcoat of (a) on the glass fabric. The blend coating can be obtained by applying a dispersion of (a) which contains (b) still in the polyhydrolyzable state, and optionally, the water repellent additive, to the fabric, followed by drying without sintering the polytetrafluoroethylene.

This application is a continuation-in-part of U.S. patent application Ser. No. 146,837, filed May 25, 1971, by the same inventor abandoned Nov. 1, 1972.

This invention relates to polytetrafluoroethylene coatings for glass fabrics which are especially useful as filter media.

Fabric filters are commonly used to separate particles from a gas stream either for collection purposes or pollution control purposes in such processes as the manufacture of cement and carbon black. When high temperatures or corrosive gas streams are involved, fabric filters made of glass fiber would theoretically be useful in such application because of the relatively high melting point and chemical inertness of glass. However, the use of glass fabrics has been hampered by the fact that flexure of the fabric to effect removal of dust filtered from a passing gas stream causes the glass fibers to break, leading to fracture and failure of the fabric as an effective filter.

Various attempts have been made to coat the glass fabric (either after waeving of the glass yarn into the fabric or prior to weaving) with a material which increases the flex life of the glass fabric. For example, glass fabrics have been coated with polytetrafluoroethylene or with silicone oil. Another approach has been to coat the glass fabric first with an ethylene oxide condensate or a polyethylene glycol fatty acid ester, followed by a coating of polytetrafluoroethylene (U.S. Pat. No. 3,090,701 to Shulver and Guyer). Still another approach has been to coat the glass fabric with a solid dispersion of polytetrafluoroethylene in butadiene-acrylonitrile copolymer (Canadian Pat. No. 577,680 to Caroselli). While these coatings do effect some improvement in the flex life of the glass fabric, further improvement is desired so that the life of the filter fabric can be extended in time and to higher temperatures and particle filtration can be achieved on a less interrupted basis.

The present invention provides coated glass fabric which has improved flex life after heat aging and processes for coating glass fabric to obtain this improved result. The coating on the fabric of the present invention comprises (a) unsintered polytetrafluoroethylene (PTFE) having a specific melt viscosity of at least $1 \times 10^9$ poises at 380° C. and (b) condensation product of a polyhydrolyzable compound which is a silane or a compound of tetravalent titanium, zirconium, or tin. These components can be present on the fabric as either a blend of (a) and (b) or as a basecoat of (b) and topcoat of (a). In one embodiment of the coating, it contains a water repellent additive to prevent water from soaking into the fabric mixing with the filtered particulate, and blinding the apertures of the fabric.

The basecoat, topcoat coating can be obtained by a two-step procedure of first applying the basecoat of polyhydrolyzable compound to the fabric and then applying the PTFE coating.

The blend coating can be applied in a one-step procedure using a novel coating composition, which is also the subject of the present invention, which comprises an aqueous dispersion of the PTFE, the dispersion containing the polyhydrolyzable compound. The coating composition can contain the water-repellent additive. Preferably, the polyhydrolyzable compound is water soluble so as to be present as a solution in the aqueous phase of the dispersion. The coating composition is applied to the fabric and then dried at temperatures which cause condensation of the water soluble compound but which are insufficient to cause sintering of the PTFE. Sintering of the PTFE would detract from the flex life of the fabric.

With respect to the language "condensation product of a polyhydrolyzable compound", this describes the sequence of reactions that the silane or compound of tetravalent Ti, Zr, or Sn undergoes. It is the capability of the polyhydrolyzable compound to undergo first hydrolysis, to render it condensible, and then condensation that is believed responsible for the beneficial effect of the polyhydrolyzable compound in the present invention. Thus the chemical makeup of the polyhydrolyzable compound can vary over a wide latitude so long as it renders the resultant compound polyhydrolyzable.

In greater detail, the "polyhydrolyzable" aspect of the silane and tetravalent Ti, Zr, and Sn compound means that the compound possesses at least two groups that are hydrolyzable by contact with water. Preferably, the silane and Ti, Zr, and Sn compound has at least 3 hydrolyzable groups and in the case of the Ti, Zr, and Sn compounds, four hydrolyzable groups.

Hydrolysis of the silane and Ti, Zr, and Sn compounds converts them to polyhydroxy compounds, for example, by hydroxyl groups replacing halide or oxyhydrocarbon groups of the silane or Ti, Zr, or Sn compound. The hydroxy functions of the polyhydroxy compound render the compound condensible by splitting out water to form a condensation product of the repeat unit

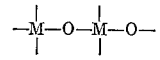

wherein M is Si, Ti, Zr, or Sn and the unsatisfied valences are satisfied with one or more of the following: Hydrolyzable groups, hydrolysis product of such groups, and the same repeat unit to form a network structure of alternating M atoms and O atoms. For the silane, each silicon atom will have at least one of its bonds connected to an aliphatic carbon atom.

If heat is required to split off the water, the reaction can be called pyrolysis. The hydrolysis and condensation reactions can occur in sequence, or insofar as is discernible, simultaneously. Identification of the different stages of the reaction is unimportant; it is only necessary that the silane and Ti, Zr, and Sn compound undergo at least some of the condensation reaction in contact with the glass fabric. Thus, the condensation product is formed *in situ* on the glass surface of the glass fabric.

Generally, the polyhydrolyzable silane or Ti, Zr, or Sn compound is applied to the glass fabric from a liquid medium, organic or aqueous, the choice of which depends mainly on the reactivity characteristics of the polyhydrolyzable compound insofar as they affect the goal of *in situ* formation of the condensation product. For example, some of the polyhydrolyzable compounds react rapidly with water even at low temperatures, e.g. room temperature, to form an insoluble precipitate, presumably a product of both hydrolysis and condensation, rendering the compound no longer being in form suitable for application to the glass fabric. In such case, the polyhydrolyzable compound should be applied to the glass fabric from an organic medium, using the two-step procedure for forming the coating of the present invention. In some cases, the polyhydrolyzable compound, although reactive with water, is so slowly reactive that an aqueous medium, including the PTFE aqueous dispersion, can be used to apply the compound before the reaction has occurred to the extent of forming a precipitate in the medium. In this case, the one-step procedure for forming the coating of the present invention can be used. Thus, it is seen that a polyhydrolyzable compound which may not be operable when applied from one medium can be made operable by choosing another medium, and the choice of medium will determine whether the one-step or two-step coating procedure is used. Regardless of medium, the polyhydrolyzable compound should either be soluble or finely dispersible therein.

When the medium is organic, hydrolysis of the polyhydrolyzable compound occurs after application to the glass fabric and removal of the organic medium. At that time, contact of the water (vapor) in the atmosphere with the dried compound leads to the hydrolysis reaction. In the case of using an aqueous medium, the hydrolysis can occur at least to some extent during the storage of the coating medium, or upon heating the coating after application to the glass fabric to evaporate the water. For either the organic or aqueous application medium, the drying step can be accompanied by heating to increase the drying rate and where necessary, in the case of stable compounds, to cause the hydrolysis reaction and/or condensation reaction to occur. The temperature and time of heating is chosen to give the degree of condensation desired, but is insufficient to cause sintering of the PTFE in the coating.

In the case of the coating composition of the present invention wherein the polyhydrolyzable compound is water soluble, this refers to solubility in water at 25° C. in concentrations that would be effective to increase flex life when in the corresponding concentration in the aqueous phase of the PTFE dispersion. The water may contain a minor proportion of one or more miscible organic compounds which accompany the polyhydrolyzable compound as commercially available or which acts as a solution aid to make the polyhydrolyzable compound soluble in water. The degree of hydrolysis of the compound should be insufficient to cause, in an equivalent amount of water at 25° C., the hydrolysis product to precipitate out of the solution, which allows for a reasonable shelf life of the novel coating composition of the present invention wherein the hydrolyzable compound remains in solution. Where the hydrolysis product remains water soluble although fully or extensively hydrolyzed, hydrolysis rate and shelf life are no problem. With due regard for the desire for at least a reasonable period of water solubility for the hydrolysis product, the hydrolyzable groups of the compound can be any group which reacts with water under the conditions described. Examples of such groups are halide and oxy-hydrocarbon groups. The solubility of the polyhydrolyzable compound in water in this embodiment means that the resultant solution has the appearance of water.

The expression "polytetrafluoroethylene" or "PTFE" used herein means (a) the aqueous dispersion type (called fine powder after coagulation and drying) of polytetrafluoroethylene unless otherwise indicated in order to distinguish from the granular type of polytetrafluoroethylene which is inoperable in the present invention insofar as increasing the flex life of glass fabric and (b) the polymer is unsintered.

The PTFE used in the present invention is of high molecular weight which distinguishes this polymer from polytetrafluoroethylene telomer such as available under the trademark Vydax® fluorotelomer. Such telomer has a number average molecular weight of about 2000 as compared to number average molecular weight of about one million or more for the PTFE used in the present invention. One significant aspect of this difference in molecular weight is the toughness of the higher molecular weight polymer. For example, the telomer will not form a self-sustaining film and will have no measurable elongation. In contrast, the PTFE used in the present invention is film-forming and the resultant film, e.g. 0.1 mil thick, is flexible and the polymer generally has an elongation in excess of 50% (ASTM D-1457-69). In addition, the PTFE used in the present invention is insoluble in all commercially available solvents.

The high molecular weight of the PTFE used in the present invention is indicated by apparent melt viscosity, which is an indirect measure of molecular weight, which is normally not directly measurable. The PTFE has an apparent melt viscosity of at least $1 \times 10^9$ poises at 380° C. under a shear stress of 0.457 kg./cm.$^2$ using the melt indexer described in U.S. Pat. No. 2,946,763 to Bro. This polymer is not melt-fabricable as distinguished from copolymers of tetrafluoroethylene with other copolymerizable ethylenically unsaturated monomers, such as hexafluoropropylene, in sufficient amounts to lower the melt viscosity to a range, i.e. less than $1 \times 10^6$ poises at 380° C. under a shear stress of 0.457 kg./cm.$^2$, where the polymer is fabricable from a melt.

Any of the commercially available polytetrafluoroethylene aqueous dispersions can be used in the present invention as the source of the polytetrafluoroethylene component of coatings of the present invention. The preparation of high molecular weight polytetrafluoroethylene aqueous dispersions, for example, is disclosed in U.S. Pat. Nos. 2,559,752 to Berry, 2,534,058 to Renfrew, and 2,559,749 to Benning. Briefly, the process involves pressuring tetrafluoroethylene into an aqueous solution of polymerization initiator such as ammonium persulfate or disuccinic acid peroxide and dispersing agent such as an ammonium polyfluorocarboxylate of 7 to 10 carbon atoms, under mild agitation to avoid coagulation and to produce an aqueous dispersion of colloidal size particles of the polytetrafluoroethylene having, for example, a particle diameter of less than 1.0 micron and an average particle diameter of 0.10 to 0.30 micron. Dispersions in which the polymer particles are larger in size, e.g. an average particle diameter of at least 0.3 micron, made by programming the addition of dispersing agent into the polymerization medium as described in U.S. Pat. No. 3,391,099 to Punderson, can be used in the present invention as can the modified polytetrafluoroethylene disclosed in U.S. Pat. No. 3,142,665 to Cardinal et al. These particle size measurements can be made by the light scattering or ultracentrifuge techniques described in the Punderson patent.

With respect to the condensation product component of coating of the present invention, this will be further described hereinafter, first with respect to condensation products of tetravalent titanium, which can be called titanium oxide polymer, and then with respect to condensation products of silanes and compounds of tetravalent zirconium and tin. Titanium oxide polymer is known to bond to glass (U.S. Pat. No. 2,768,909 to Haslam and U.S. Pat. No. 3,002,854 to Brill) and to polytetrafluoroethylene whe No. 3,002,854 to Brill) and to polytetrafluoroethylene when deposited from the vapor state (U.S. Pat. No. 2,898,229 to Herr and Beck), but titanium oxide polymer by itself has little effect on the flex life of glass fabric and polytetrafluoroethylene by itself supplies only marginal improvement which is outweighed by the cost of the polymer. Together, however, the titanium oxide polymer and polytetrafluoroethylene impart a surprisingly high degree of improvement in flex life to the glass fabric. For example, a coating of the present invention in many instances more than triples the flex life of glass fabric over that which is obtained when the fabric is coated with an equivalent amount of polytetrafluoroethylene alone. The coating of filler materials such as glass fibers with polysiloxane or condensed titanic acid ester, followed by adding these filler materials to a PTFE aqueous dispersion is disclosed in Can. Pat. 835,465; but this patent neither applies this coating system to glass fabrics nor recognizes the beneficial effect of such application.

The preferred titanium oxide condensation product component of coatings of the present invention can be characterized as the product of condensing tetravalent titanium oxide units

in which each titanium atom has four oxygen atoms attached to it. The condensation product is formed *in situ*, i.e. after application of its precursor which can be called hydrolyzable organic titanate, to the glass surface via an aqueous or organic solution, the titanate being applied either by itself or when water soluble, as part of the polytetrafluoroethylene aqueous dispersion. The condensation product can vary from simple linear products such as represented by the formula $(RO)_3TiOTi(OR)_3$ wherein R is a hydrolyzable organic group, i.e. replaceable by hydrogen to form —OH, to more complex linear products such as represented by the formula

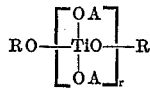

wherein $r$ is an integer greater than 1 or 2, R has the same meaning as above, and A is either R or H, to products which are completely hydrolyzed, to crosslinked products in which some of the hydrogen atoms are replaced by titanium oxide units, and finally to amorphous titanium dioxide believed to have the following three dimensional network structure

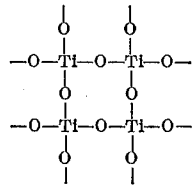

The amorphous titanium dioxide is the product of the ultimate degree of condensation of titanium oxide units and is formed by heating the hydrolyzable titanate or an incomplete condensation product thereof to remove (split off) water and/or organic groups present. The titanium dioxide pyrolyzate is considered amorphous in the sense that it does not exhibit any crystallographic structure under X-ray analysis, as distinguished from the rutile and anatase crystallographic forms of titanium dioxide.

The condensation reaction which forms the various titanates that can be present in the $TiO_2$ polymer component of moatings of the present invention is complex and can involve both hydrolysis and pyrolysis of the organic groups of the titanate precursor. As the degree of hydrolysis or pyrolysis increases, fewer and fewer organic groups are present and the degree of polymerization of titanium oxide units increases. The final phase of condensation is brought about by pyrolysis to form the network structure previously depicted.

The degree of condensation of titanium oxide units in the titanium oxide polymer component can be so small as not to be detectable by analytical means; the degree of condensation may increase later, however, in ultimate use in an application involving high temperatures, e.g. 300° C. Thus, in the broadest sense, the titanium oxide polymer can be considered as the titanate residue which is obtained by drying the composition containing the dissolved hydrolyzable organic titanate. For some highly active hydrolyzable titanates, such as tetrabutyl titanate, merely removing the organic solvent in which the titanate is soluble, permits the titanate to come into contact with air which contains water vapor to cause hydrolysis of the titanate. For some highly stable titanates, such as titanium chelates, which do not hydrolyze significantly even when contained in water at ambient temperature, some heating of the titanate residue may be desired after evaporation of the water to cause some hydrolysis to the titanate. In the case of such titanates that are applied as an aqueous medium, it is desirable for sufficient hydrolysis and/or condensation to have occurred that the resultant titanate residue is rendered insoluble in water. A typical heating condition for bringing about some condensation in the residue of the highly stable titanate is at 150° C. for at least one minute.

The titanium oxide polymer component can also be considered as a derivative of orthotitanic acid, $H_4TiO_4$, in which the hydrogen atoms are replaced by organic groups which give the resultant titanate the solubility and reactivity (hydrolyzability) desired. For example, the organic groups selected determine whether the titanate is soluble in water or in organic sovlent and the ease with which the titanate is hydrolyzed and pyrolyzed. In any event, the organic groups selected are such that they render the titanate hydrolyzable and condensible to amorphous titanium dioxide. With due regard for these requirements, any of the hydrolyzable titanates can be used to form the titanium oxide polymer component of coatings of the present invention. Representative of such titanates are those described in the booklet *"Tyzor" Organic Titanates*, publication D-4072 Rev. 3M 1070 by the E. I. du Pont de Nemours and Company. These titanates include the orthoesters and acylates of orthotitanic acid, represented by the formula $Ti(OR^1)_4$ and $Ti(OCOR^1)_{4-p}(OR^1)_p$, respectively, wherein $R^1$ can be alkyl, aryl, or cycloalkyl typically containing from 1 to 8 carbon atoms and $p$ is an integer of 0 to 3. The titanium chelates which are water soluble can also be used, these being represented by the formula $Ti(OR^1)_p(OYXR^1)_{4-p}$ wherein $R^1$ and $p$ have the same meanings as above, Y is a two or three carbon atom chain and X is oxygen or nitrogen (when X is oxygen there is one $R^1$ group and when X is nitrogen there are two $R^1$ groups attached thereto). In all of the above formulas, $R^1$ can also be hydrogen except to the extent that orthotitanic acid would be the resultant compound. Examples of specific hydrolyzable titanates include the tetraalkyl titanates such as tetraethyl titanate, tetraisopropyl titanate, and tetrabutyl titanate; tetraethylene glycol titanate; triethanolamine titanate; titanium acetyl acetonate; titanium lactate; and the pre-polymer which can be obtained by reacting tetraalkyl titanate with water. In the broadest sense, the titanate contained in the coating composition as applied (before drying) is titanate which after drying will condense (condensation of titanium oxide units), which condensation is believed at least initially to occur through hydrolysis of the titanate. As stated hereinbefore, the organic titanate selected will depend on whether water solubility is desired as in the coating composition of the present invention, or whether two-step coating is carried out using an organic solvent to apply the organic titanate from a dispersion or solution to the glass fabric.

The foregoing discussion of organic titanates and the titanium oxide polymer component of coatings of the present invention is generally applicable to zirconium, Thus organic compounds of these metals can be represented by the formulas $Zr(OR^1)_4$, $Zr(OCOR^1)_{4-p}(OR^1)_p$, and $Zr(OR^1)_p(OYXR^1)_{4-p}$ wherein $R^1$, Y, X, and $p$ have the same meaning as above. Examples of such compounds are the tetraalkyl zirconates such as tetraethyl and tetrabutyl zirconate and the water soluble chelates thereof. The condensation product of the suitable organic compounds of zirconium contains the repeat unit

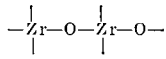

with the free valences being satisfied by hydrolyzable groups, hydrolysis product of such groups, or the same repeat unit (connected through oxygen atoms), depending on the degree of condensation of the organic compound.

With respect to the polyhydrolyzable silane, reference to this compound as a silane means that it contains at least one Si-C (aliphatic/carbon atom) group. The silane is monomeric (prior to exposure to water) and can be represented by the formula

wherein D is the water-hydrolyzable functional group, B is an organic group which contains a carbon atom bonded to the Si atom of the formula, and C can be either D or B. When two B groups are present, at least one of them has an aliphatic carbon atom bonded to the silicon atom of the formula. Examples of group D include halogen, such as Cl or F; alkoxy, preferably containing from 1 to 5 carbon atoms; aryloxy, e.g., phenoxy or naphthoxy; and acetoxy. Examples of group B include aliphatic and aromatic groups such as

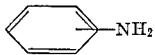

bonded directly to the Si atom or indirectly thereto, such as through an alkylene group, and the group $$-(CH_2)_xNH_2$$

wherein $x$ is an integer of from 2 to 12, but preferably 3 to 9; $-(CH_2)_yNH(CH_2)_zNHR$, wherein $y$ is an integer of from 2 to 4, and $z$ is an integer of from 1 to 4, and R is H, methyl or ethyl; and $(CH_2)_xN(CH_3)_z$, wherein $x$ has the same meaning as before. Preferred silanes include the amino-functional silanes such as the omega-aminoalkyltrialkoxy silanes, such as gamma-aminopropyltriethoxy silane, meta and para aminophenyltriethoxy silane, and N(-n-propyl trimethoxysilyl) ethylene diamine. Instead of group B containing an amino-function, it can contain such other functions as epoxy, carbonyl, or vinyl.

The silanes as coupling agents for bonding polymers to glass is disclosed in the art, as represented by U.S. Pat. No. 3,013,915 to Morgan; U.S. Pat. Nos. 3,252,825, 3,252,278 and 2,931,739 to Marzocchi et al.; U.S. Pat. No. 3,318,757 to Atwell; U.S. Pat. No. 2,920,095 to Jex et al.; U.S. Pat. No. 3,231,540 to Vanderbilt; British Pat. No. 1,069,752, U.S. Pat. No. 3,306,800 to Plueddemann, U.S. Pat. No. 3,558,345 to Baum, and German Pat. Publication 1,954,233 to Effenberger.

Alkali metal and organic orthosilicate compounds are not included in the present invention because they appear to be inoperable insofar as having a beneficial effect on the flex life of glass fabric in the present invention. Aqueous dispersions of PTFE which contain alkali metal silicates are disclosed in U.S. Pat. No. 2,710,266 to Hochberg and which contain alkyl orthosilicates are disclosed in U.S. Pat. No. 3,644,260 to Strolle.

The selection of the silane as the polyhydrolyzable compound will depend on whether water solubility is desired as in the case of use in the novel coating composition of the present invention. If the silane is water-insoluble, an organic solvent solution thereof can be used to apply the silane to the glass fabric as the first coat in the two-step coating embodiment of the present invention. In either coating embodiment, the mechanism of hydrolysis and pyrolysis to form condensation products of the repeat unit

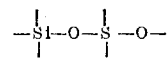

occurs, wherein the free valences are satisfied by additional hydrolyzable groups, hydrolysis product thereof, or the same repeat (connected through oxygen atoms), with the proviso that at least one of the bonds for each silicon atom is connected to an aliphatic carbon atom.

Water polyhydrolyzable compounds of tetravalent tin can be organic or inorganic compounds such as $SnCl_4$. The hydrolysis/condensation product of such tin compounds has the repeat unit

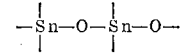

wherein the free valences are satisfied by hydrolyzable groups, hydrolysis product of such groups, or the same repeat unit (connected through oxygen atoms).

The glass fabric to which coatings of the present invention are applied can be made of any glass such as soda-lime-silica, aluminosilicate or borosilicate, but will usually be the glass from which commercially available glass yarn is made. Typically, the glass fabric will have a sizing, such as starch, on the surface thereof. Contrary to previous experience of coating glass fabrics with lubricating systems, the coatings of the present invention can be applied to the sized glass fabric which is called "griege goods." If desired, however, the glass fabric can be cleaned of sizing such as by conventional heating procedures prior to coating according to the present invention. A typical heat-cleaning process involves passing a web of glass fabric through an oven heated at about 700° C. in order to burn off the sizing.

In the case of the two-step coating procedure, the polyhydrolyzable compound can be applied to the glass by dipping, spraying, or otherwise contacting the glass fabric with a solution or dispersion medium of the compound of any concentration depending on the desired weight pickup of compound by the glass. The medium can be either an organic solvent or water depending on the solubility characteristics of the compound therein and the reactivity of the compound with the medium. Typical organic media which are solvents include isopropanol, n-heptane, trichloroethylene, tetrachloroethylene, n-butanol, benzene, isopropanol-water, methyl ethyl ketone, and Stoddard solvent. In the case of a polyhydrolyzable compound that is or becomes insoluble in water, an organic solvent solution of the compound can be made up which in turn is soluble in water. By way of example, titanium acetyl acetonate is soluble in isopropanol but not in water. By first adding glacial acetic acid to the titanate-isopropanol solution, the resultant solution will accept water (slowly added with stirring) to become an aqueous solution. The polyhydrolyzable compound and solvent are selected so that any undesirable amount of hydrolysis of the compound does not occur until heating of the coating is done to evaporate the liquid medium. Thus, titanates that react with water at ambient temperature, such as tetrabutyl titanate, are used as an organic solvent solution. Polyhydrolyzable compounds that are water soluble and not appreciably reactive with water at ambient temperatures, such as titanium lactate and omega-aminoalkyltrialkoxy-silanes, can be used as an aqueous solution. The hydrolyzability of some of the compounds is retained even though the compound is dissolved in an aqueous medium. After coating onto the glass fabric, the solvent is removed by drying with or without heat to form the desired layer of condensation product on the glass fabric.

In the two-step coating procedure the step of drying the base coat of polyhydrolyzed compound or condensation product thereof is followed by the step of applying the top coating of polytetrafluoroethylene. The polytetrafluoroethylene content of the dispersion can be at any level desired depending on the thickness of coating desired. The resultant twice-coated glass is then dried. The drying temperature should not exceed 300° C. to insure that sintering of the polytetrafluoroethylene does not occur which would lower the flex life of the fabric.

In the single-step coating procedure, the polyhydrolyzable compound is contained in the aqueous dispersion of polytetrafluoroethylene and the resultant dispersion is coated onto the glass, followed by drying (but not sintering of the polytetrafluoroethylene) to yield a coating of the polytetrafluoroethylene blended with the condensation product of the compound. This blend is not necessarily a uniform blend because it is believed that during evaporation of the aqueous phase of the dispersion, a substantial proportion of the dissolved compound migrates to the glass surface so that the resultant coating is ultimately rich in polytetrafluoroethylene at the exposed surface of the coating.

It is in the one-step coating procedure that the coating composition of the present invention can be used wherein the polyhydrolyzable compound added to the PTFE aqueous dispersion is water soluble.

Generally, in both the one-step and two-step processes, a total coating thickness applied will depend on the utility desired for the coated glass fabric. Use in filtering an abrasive fluid stream will generally call for relatively thick coatings in order to prolong the life of the fabric. For most applications, very little coating is required to give some improvement in flex life of the glass fabric and any advantage in applying excessively thick coatings is outweighed by the decreased permeability and bulkier handling of the fabric, and the added cost of the coating. In any event, the apertures in the fabric between the yarn making up the fabric are not closed by the coating. Typically, good results are obtained at a coating loading, either one-step or two-step, of from 1 to 80 grams per square meter of area of glass fabric (one side) and usually 1 to 60 g./m.$^2$, with from 15 to 60 g./m.$^2$ and usually 15 to 45 g./m.$^2$ giving optimum results, depending on the particular glass fabric being coated.

For both the one-step and two-step coating procedures, the polytetrafluoroethylene will generally, but not necessarily, comprise from 50 to 99.5 weight percent of the coating on the glass fabric and the condensation product of the polyhydrolyzable compound (assuming the residue of the compound is condensation product) from 0.5 to 50 weight percent to total 100 percent of the coating. Preferably, the coating comprises at least twice as much polytetrafluoroethylene as condensation product. The weight of coating and weight percents of the components therein are taken after heating the dry coating at 150° C. for 10 minutes (hereinafter called dry basis). In the two-step embodiment, all the condensation product will usually be in a separate (interventing) layer from the polytetrafluoroethylene (PTFE), although the PTFE top coat can also contain some condensation product. In the one-step embodiment, the aforementioned composition is the composition of the blend layer.

With respect to the novel coating composition of the present invention, the aqueous dispersion of the polytetrafluoroethylene will generally contain from 2 to 70 percent of PTFE based on the weight of the PTFE plus water and sufficient water soluble (dissolved) polyhydrolyzable compound to provide the condensation product content stated above in the resultant blend coating. Thus, the concentration of the polyhydrolyzable compound added to the dispersion can be characterized as from 1 to 70 percent based on the weight of PTFE present. Preferably, at least twice as much PTFE as polyhydrolyzable compound is present in the dispersion. Since the condensation product weighs less than the polyhydrolyzable compound when added, these compositions will dry to the coating desired.

While the coating embodiments of the present invention are described in terms of on-step (one coat) or two-step (two coats), it is contemplated that for either embodiment, several coats of the same component can be applied in order to obtain the coating thickness desired.

It is also within the scope of the present invention to prepare glass yarn with a coating of the present invention, optionally using the coating composition of the present invention in the same manner as just described for fabric, and then form the coated yarn into fabric.

In another embodiment of the present invention, a minor amount of compatible water-repellent additive is added to the polytetrafluoroethylene aqueous dispersion used in either the one-step or two-step coating procedure of the present invention so that upon drying of the coating on the glass fabric, water condensate does not spread over the surface of the glass fabric (or soak or wick along the yarn of the fabric) when first contacted with solids-containing hot gas, which could ultimately cause blinding of the fabric. Any additive which is water soluble or dispersible and which renders the fabric hydrophobic can be used. The additive need not have the thermal stability of the coating itself and can be burned out by the hot exhaust gas because once the glass fabric is heated above the boiling point of water, condensation of water vapor does not occur. Generally, from 0.1 to 10 percent based on the weight of polytetrafluoroethylene in the coating or in the novel coating composition of the present invention will impart sufficient hydrophobicity to the fabric but any amount which achieves this result without being deleterious to the fabric can be used. The amount required to achieve this result will vary with the amount and type of surfactant present in the PTFE aqueous dispersion; usually such dispersion contains from 1 to 15 percent of surfactant, usually anionic or nonionic, based on the weight of the PTFE in the dispersion.

The surfactants added to the dispersion are soluble in water at room temperature (20–25° C.) at the concentration desired. Examples of surfactants include reaction products of ethylene oxide with other compounds which impart hydrophobic moieties to the resultant surfactants, such as propylene oxide, amines, saturated and unsaturated alcohols and acids, and alkyl phenols. Other suitable surfactants which do not involve reaction with ethylene oxide but which can be used in the present invention are the alkanol amides and the fatty esters such as the methyl esters of caprylic, caproic, stearic, and oleic acids. For purposes of illustration, some of the foregoing described surfactants can be further described by the following formulae:

$$R^2[O(E)_nH]_u$$

wherein $E_n$ is the group $(-C_2H_4O-)_u$ or a mixture of the groups $(-C_2H_4O-)_a$ and $(-C_3H_6O-)_b$, wherein $n$ in each instance is an integer of from 2 to 50 and preferably 2 to 18, $b$ is an integer of 0 to 30, and $a$ is an integer of at least 2, $a$ and $b$ being equal to $n$; $u$ is an integer of 1, 2, or 3; and $R^2$ is an aliphatic hydrocarbon group which can be saturated or unsaturated, straight-chain, branched, or cyclic, and will generally contain from 8 to 24 carbon atoms, preferably from 8 to 18 carbon atoms; examples of $R^2$ groups include oleyl, stearyl, tridecyl, lauryl, decyl and the groups derived from aliphatic glycols and triols;

$$R^3-C_6H_4O(G)_mH$$

wherein $G_m$ is the group $(-C_2H_4O-)_m$ or a mixture of the groups $(-C_2H_4O-)_c$ and $(-C_3H_6O-)_d$ wherein $m$ in each instance is an integer of from 2 to 50 and preferably 8 to 20, $d$ is an integer of 0 to 30, $c$ is an integer of at least 2 and $c$ plus $d$ being equal to $m$; $R^3$ is a monovalent aliphatic hydrocarbon group, either straight-chained or branched and usually saturated and containing 4 to 20 carbon atoms and preferably 8 to 12 carbon atoms;

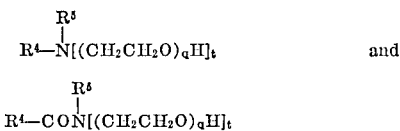

wherein $q$ is an integer 2 to 50, $t$ is an integer of 1 or 2, $R^4$ is an alkyl group containing 1 to 8 carbon atoms, $R^5$ is a chemical bond to a group $(CH_2CH_2O)_qH$ when $t$ is 2 and an alkyl group of 1 to 8 carbon atoms when $t$ is 1, with the proviso that at least 6 carbon atoms are provided by $R^5$ plus $R^4$; the polyalkylene oxide block polymers of the formula.

$$HO(C_2H_4O)_e(C_3H_6O)_f(C_2H_4O)_gH$$

where $f$ is an integer of from 15 to 65 and $e$ and $g$ are integers sufficiently large that $e$ plus $g$ total 20 to 90 percent of the total weight of the polymer. For each of the surfactants of the foregoing described formulae, the hydrophobic and hydrophilic moieties are proportioned and the total molecular weight is such that the aforementioned requirement of water solubility is met. Additional specific surfactants include $$CH_3(CH_2)_4CH_2(OCH_2CH_2)_3OH;$$
$$CH_3(CH_2)_6CH_2(OCH_2CH_2)_3OH;$$
$$CH_3(CH_2)_{10}CH_2(OCH_2CH_2)_{12}(OCH(CH_3)CH_2)_5OH;$$
$$CH_3(CH_2)_8CH_2(OCH_2CH_2)_{10}OH;$$
$$CH_3(CH_2)_8CH_2(OCH_2CH_2)_5OH; \text{ and}$$

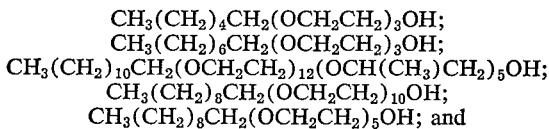

The water-repellent additives are most commonly available as Zepel® and Scotchgard®, which can be characterized as polymers of fluorinated esters of an acrylic acid, including methacrylic acid (fluorinated acrylate polymer). The fluorination of the ester group is generally in the form of a perfluoroalkyl group containing from 3 to 12 carbon atoms. The polymers can be homopolymer or copolymers, including segmented copolymers, with other copolymerizable monomers, with the ester repeat unit which supplies the water repellancy to the polymer being generally represented by the formula

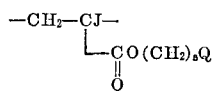

wherein J is H or $CH_3$, $s$ is an integer of 1 to 12, and Q is an organic group which contains a perfluoroalkyl group of 3 to 12 carbon atoms. Examples of monomers from which this repeat unit is derived by polymerization (or copolymerization) are as follows:

$CH_2=CHCOOCH_2(CF_2)_2CF_3$,
$CH_2=CHCOOCH_2(CF_2)_4CF_3$,
$CH_2=CHCOOCH_2(CF_2)_8CF_3$,
$CH_2=CHCOO(CH_2)_{11}(CF_2)_7CF_3$,
$CH_2=C(CH_3)COOCH_2CH_2N(CH_3)SO_2(CF_2)_7CF_3$,
$CH_2=CHCOOCH_2CH_2N(CH_2CH_2CH_3)SO_2(CF_2)_7CF_3$, and
$CH_2=C(CH_3)COOCH_2CH_2(CF_2)_5CF_3$.

These water-repellant additives are soluble in some organic solvents and are generally available as an aqueous dispersion which can conveniently be added to the PTFE aqueous dispersion to form a co-dispersion. Further Examples of water-repellant additives are disclosed in U.S. Pat. Nos. 2,642,416, 3,068,187, 3,102,103, 3,256,230, 3,256,231, 3,277,039, 3,378,609, and 2,803,615.

Examples of the present invention are as follows: In these Examples, parts and percents are by weight unless otherwise indicated. The following procedures and materials were used unless otherwise indicated.

The test for determining the flex life of glass fibers in the form of fabric is the MIT flex test conducted as follows: The apparatus used is an MIT Folding Endurance Tester made by Tinius Olsen Testing Machine Company, which basically consists of a pair of spaced jaws arranged to grip opposite ends of a glass fabric sample. The machine operates to fold the fabric sample repeatedly back and forth about a line of flexure through an angle of 270° C. The flex life of the sample is the number of double folds (two folds being equal to one cycle) sustained by the sample prior to breaking. During the folding, one of the jaws is biased away from the other by a given constant load ranging from 908 to 2070 grams, and when the sample breaks the biased jaw pulls away from the other jaw, indicating the test has ended. At least three runs are made for each fabric sample (three samples of the same fabric) and the flex life reported is the mean value of the three runs. The glass fabric sample is die cut from larger samples of glass fabric, each sample being 7.61 cm. long in the warp direction and 1.27 cm. wide in the perpendicular direction. Thus, it is the flex life of the warp threads that is being tested unless otherwise indicated. Adhesive tape is secured to each end of the sample on both sides thereof at the location where gripped by the jaws to prevent slippage of the sample within the jaws during the flex testing.

Resistance to heat (heat aging) is measured by heating the sample of glass fabric at 280–315° C. in a circulating air oven for 40 hours followed by subjecting the sample to the MIT flex test.

Resistance to acid vapor of the glass fabric is tested by suspending the sample in an enclosed vapor space for 100 minutes above an aqueous solution of 35 percent by weight sulfuric acid heated to refluxing (about 100° C.) followed by subjecting the sample to the MIT flex test.

The polytetrafluoroethylene aqueous dispersion used in the examples contained polytetrafluoroethylene particles having an average diameter of 0.26 micron, predominantly spheroidal in shape. The dispersion contained 6.0 percent by weight of Triton® X–100 nonionic dispersing agent believed to have the formula

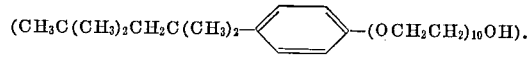

The polytetrafluoroethylene in the dispersion had a melt viscosity of about $10^{11}$ poises at 380° C. under a shear stress of 0.457 kg./cm.$^2$.

The titanium acetyl acetonate used in the examples is the reaction product of 1 mole of tetraisopropyl titanate and 2 moles of acetyl acetone. The titanium lactate used in the examples is the neutralized (ammonium) reaction product of 1 mole of tetraisopropyl titanate with 2 moles of lactic acid.

The glass fabrics used in the Examples are styles A, B, and C having the specifications tabulated below:

|  | Glass fabric style | | |
| --- | --- | --- | --- |
|  | A | B | C |
| Average permeability (m.$^3$/min. per m.$^2$). | 4.5–6.0 | 23.5 | 10.5. |
| Weight (g./m.$^2$) | 298 | 310 | 520. |
| Thread count (picks/in.) | 54x52 | 54x30 | 50x30. |
| Weave | Crowfoot | Twill | Twill. |
| Warp yarn | 150's 1/2 | 150's 1/2 | 150's 1/2. |
| Fill yarn | 150's 1/2 | Bulked 1/4 | Bulked 1/4. |

EXAMPLE 1

A. A stock solution of hydrolyzable titanate was prepared by adding 4 parts of a solution of 75 percent titanium acetyl acetonate in isopropanol with 8 parts of glacial acetic acid, and to this mixture was added dropwise 88 parts of distilled water to make an essentially aqueous solution of the titanate.

B. The fabric treated in this Example was heat cleaned style C glass fabric and the load used in the MIT flex test was 2070 g. The coating procedure was to soak the fabric in the coating solution or dispersion as the case may be, followed by passing the coated fabric through the nip rolls of a wringer and drying at 150° C. for 10 minutes.

C. In one experiment, the heat-cleaned fabric was subjected to the MIT flex test without any coating on the fabric, and the flex life of the fabric was found to be 1230 cycles.

D. In another experiment, the heat-cleaned fabric was coated with the titanate stock solution, and the MIT flex life of this sample was 1090 cycles, showing that no improvement in flex life results from the titanate oxide polymer coating alone.

E. In another experiment, the heat-cleaned fabric was coated with an aqueous dispersion of polytetrafluoroethylene (6 percent PTFE solids) to give a polytetrafluoroethylene loading on the fabric of 33.5 g./m.$^2$ (dry basis) and an MIT flex life of 3540 cycles.

F. The experiment of paragraph E was repeated except that the titanium oxide polymer coated fabric of paragraph D was used. The resultant glass fabric having both a coating of titanium oxide polymer and a top coating of polytetrafluoroethylene, total loading on fabric of 36 g./m.$^2$ (dry basis), exhibited an MIT flex life of 8200 cycles.

EXAMPLE 2

375 ml. of the titanate stock solution of Example 1 was mixed with 375 ml. of an aqueous dispersion of polytetrafluoroethylene (60 percent PTFE solids) and the resultant dispersion was incrementally diluted further with distilled water to obtain different loadings of coating heat-cleaned style C fabric coated and dried by the procedure of Example 1, with the results reported in the following table (Table I):

TABLE I

| Loading (dry basis) g./m.$^2$ | Mit flex life-cycles, 2070 g. load |
|---|---|
| 52.5 | 10,890 |
| 39.5 | 9,890 |
| 28.8 | 8,960 |
| 16.5 | 9,010 |
| 5.5 | 4,220 |
| 1.9 | 2,720 |

This series of experiments show the trend of increasing flex life with blend coating loading on the fabric. The lowest loading tabulated (1.9 g./m.$^2$), which approximated the loading for titanium oxide polymer of paragraph D of Example 1, gave more than double the flex life. At the loading of 28.8 g./m.$^2$ of the blend, the flex life was more than twice that obtained for the 33.5 g./m.$^2$ coating of polytetrafluoroethylene alone as reported in paragraph E of Example 1.

For comparison purposes, mixtures of the titanate stock solution of Example 1 were made with aqueous dispersions of various other polymers, and heat-cleaned style C glass fabric was coated and dried with these mixtures and the MIT flex life (2070 g. load) was determined. Details of the experiments are as follows: In one experiment, the mixture was 50 ml. of stock titanate solution and 50 ml. of an aqueous dispersion of poly(tetrafluoroethylene/hexafluoropropylene) (about 16 percent HFP in the copolymer and 55 percent solids in the dispersion) to give a blend coating loading of 30 g./m.$^2$ (dry basis) and an MIT flex life of 3410 cycles. In another experiment, the copolymer dispersion of the previous experiment was replaced by an aqueous dispersion of polyethylene which gave a blend coating loading of 27.5 g./m.$^2$ (dry basis) and an MIT flex life of 1630 cycles. In still another experiment, the titanium oxide polymer coated fabric of paragraph D of Example 1 was coated with polytetrafluoroethylene telomer, having a molecular weight of 2000, contained in Cl$_2$CFCF$_2$Cl to give a telomer loading on the fabric of about 48 g./m.$^2$ (dry basis) and a MIT flex life of 2700 cycles.

EXAMPLE 3

In this example, the glass fabric tested was style C either heat-cleaned or untreated (greige goods) believed to be coated with starch sizing. The fabric samples were first soaked in a solution of 2.25 percent titanium acetyl acetonate, 0.75 percent isopropanol, 6 percent methyl ethyl ketone and 91% H$_2$O, followed by passing through a wringer and drying at 150° C. for ten minutes. An overcoat of polytetrafluoroethylene was then applied by soaking the fabric in a polytetrafluoroethylene aqueous dispersion, followed by passage through a wringer and drying at 150° C. Different loadings of polytetrafluoroethylene on the fabric were obtained by diluting the aqueous dispersion with distilled water to 20, 10, and 5 percent levels of PTFE content. The resultant two-step coated glass fabrics were subjected to the MIT flex test (908 g. load) and the resistance to heat and acid vapor was determined. Details of these experiments and results are shown in the following table (Table II).

TABLE II

| Sample | Condition of glass fabric | Loading (dry basis) g./m.$^2$ PTFE | TiO$_2$ polymer | MIT flex life (cycles) Initial | Heat-aged | Acid exposed |
|---|---|---|---|---|---|---|
| a | Heat-cleaned | 48.5 | 10.4 | 7,100 | 10,800 | 19,200 |
| a | Greige goods | 48.5 | 10.4 | 22,800 | 50,100 | 22,500 |
| b | Heat-cleaned | 25 | 5.6 | 6,400 | 4,300 | 3,800 |
| b | Greige goods | 25 | 5.6 | 18,500 | 25,700 | 14,500 |
| c | Heat-cleaned | 12.5 | 5.0 | 3,700 | | |
| c | Greige goods | 12.5 | 5.0 | 10,900 | 9,600 | 10,500 |

These results all show improvement over the 1230 cycle MIT flex life of heat-cleaned, uncoated glass fabric. These results also show that the greige goods exhibit a better flex life than heat-cleaned glass fabric when coated by the two-step process of the present invention. In addition, the coating exhibits good resistance to heat and acid fumes, in some cases showing improved flex life. A commercially available style C glass fabric coated with a finish comprising polytetrafluoroethylene, silicone oil, and graphite exhibited a MIT flex life of only 1400 cycles.

EXAMPLE 4

In this experiment, the same two-step coating system and procedure used in Example 3 was used except that the titanate stock solution contained 3.75% of the titanate, 1.25% isopropanol, 10% methyl ethyl ketone, and 85% water. Dilution of the aqueous dispersion of polytetrafluoroethylene with distilled water to a concentration of 10% polytetrafluoroethylene gave a polytetrafluoroethylene loading of 18.2 g./m.$^2$ and a titanium oxide polymer loading of 8.1 g./m.$^2$ (both dry basis). The two-step coated fabric had an initial MIT flex life of 3800 cycles for the heat-cleaned fabric and 15,400 cycles for the greige good fabric. After acid exposure, the heat-cleaned fabric exhibited a MIT flex life of 5900 cycles and the greige good sample a MIT flex life of 12,200 cycles. The results of this experiment are comparable to samples b of Table II in which the PTFE aqueous dispersion was also diluted to 10% PTFE, the lower titanium oxide polymer concentration of those samples giving better results.

EXAMPLE 5

In this series of experiments, 100 parts of the titanate stock solution of Example 3 were added to 50 parts of polytetrafluoroethylene aqueous dispersion (60% PTFE solids) to form one dispersion (samples a) which was diluted first with 100 parts of water (samples b) and then with another 100 parts of water (samples c). Glass fabric style C, both heat-cleaned or greige goods, were soaked in these resultant dispersions, followed by passage through a wringer and heating at 150° C. for 10 minutes. Details on coating loading and the results of MIT flex testing (908 g. load) of the samples are shown in Table III.

TABLE III

| Sample | Condition of glass fabric | Loading (dry basis) (g./m.²) PTFE | Loading (dry basis) (g./m.²) TiO₂ polymer | MIT flex life (cycles) Initial | MIT flex life (cycles) Heat-aged | MIT flex life (cycles) Acid exposed |
|---|---|---|---|---|---|---|
| a | Heat-cleaned | 41 | 7.5 | 7,800 | 27,300 | 20,600 |
| a | Greige goods | 41 | 7.5 | 40,700 | 21,500 | 33,500 |
| b | Heat-cleaned | 21.2 | 5.1 | 9,300 | 8,600 | 9,400 |
| b | Greige goods | 21.2 | 5.1 | 23,400 | 21,800 | 11,800 |
| c | Heat-cleaned | 11.8 | 5.6 | 7,600 | 9,000 | 5,900 |
| c | Greige goods | 11.8 | 5.6 | 15,900 | 23,800 | 15,400 |

As in case of Examples 3 and 4, the flex life of coated greige goods was better than that of coated heat-cleaned greige goods.

EXAMPLE 6

In this experiment, 100 parts of the titanate stock solution of Example 4 was added to 20 parts of an aqueous dispersion of polytetrafluoroethylene (60% PTFE), giving a loading in the blend coating of 20 g./m.² PTFE and 6.2 g./m.² titanium oxide polymer (dry basis) on the fabric used in Example 5. The MIT flex life (908 g. load) of the coated heat-cleaned fabric was 10,200 cycles and of the coated greige-goods fabric was 24,300 cycles.

EXAMPLE 7

In this Example, the glass fabric used was heat-cleaned style A, and the MIT flex test was conducted at a load of 1816 g. on the fabric. The following solutions of titanate in aqueous dispersion of polytetrafluoroethylene were made:

| Ingredient¹ (grams) | Coating composition A | B | C | D |
|---|---|---|---|---|
| PTFE aqueous dispersion² | 400 | 400 | 400 | 200 |
| Titanate solution³ | 177 | 115 | 80 | 16 |
| Glacial acetic acid | 354 | 230 | 160 | 16 |
| Water (distilled) | 666 | 855 | 960 | 176 |

¹ The ingredients are prepared by adding the acetic acid to the titanate solution, followed by dropwise addition of sufficient water to enable the resultant aqueous solution to be mixed with the aqueous dispersion and addition of more water to obtain the coating loading desired.
² 60 percent PTFE.
³ 75 percent titanium acetyl acetonate and 25 percent isopropanol.

Samples of the glass fabric were soaked in the resultant dispersion solutions, followed by passage through a wringer and drying at 200° C. for 4 minutes. Details of these experiments and the MIT flex test results are shown in Table IV.

TABLE IV

| Coating composition | Ratio of polytetrafluoroethylene to TiO₂ polymer (dry basis) | Loading of entire coating (dry basis) (g./m.²) | MIT flex life (cycles) Initial | MIT flex life (cycles) Heat-aged | MIT flex life (cycles) Acid exposed |
|---|---|---|---|---|---|
| A | 1.8/3.0 | 15.6 | 1334 | 959 | 2,012 |
| B | 2.8/1.0 | 15.6 | 1,129 | 1,647 | 938 |
| C | 4.0/1.0 | 15.6 | 939 | 1,936 | 873 |
| D | 20.0/1.0 | 15.6 | 878 | 3,187 | 1,275 |

The result was at least about a twenty-fold improvement in all cases over the MIT flex life of 94 cycles for uncoated heat-cleaned Style A glass fabric. Repeat of this series of experiments, except for giving the fabric another coat of the dispersion to give a coating loading of 30 g./m.² gave coated fabric exhibiting still greater improvement in MIT flex life.

EXAMPLE 8

The procedure of Example 7 was repeated for Composition D except that less water was used and the composition contained 5.5 percent of an aqueous dispersion of fluorinated acrylate polymer (14% polymer solids), specifically, the mixture of fluorinated and non-fluorinated polymer emulsions of Ex. VII of U.S. Pat. 3,378,609. The loading of coating on the glass fabric was 36 g./m.² and the MIT flex life (1816 g. load) of the fabric was 3792 cycles and 4808 and 2721 cycles after heat aging and acid exposure, respectively. Repeat of this procedure except for omission of the acrylate polymer gave the same coating loading and a MIT flex life of 3842 cycles and 5939 and 2902 cycles after heat aging and acid exposure, respectively. These results show that the water repellent additive does not adversely affect the flex life of the glass fabric.

EXAMPLE 9

In this Example, a sample of heat-cleaned style A glass fabric was soaked in polytetrafluoroethylene aqueous dispersion (35% PTFE), passed through a wringer and dried at 150° C. for 10 minutes. The resultant sample had a polymer loading of 31 g./m.² and a MIT flex life (2070 g. load) of 1340 cycles. Repeat of this experiment, except that the dispersion had dissolved therein 1 percent of titanium acetyl acetonate (added as the stock solution of Example 1) based on the entire weight of the dispersion, gave an MIT flex life of 7260 cycles.

EXAMPLE 10

200 g. of polytetrafluoroethylene aqueous dispersion were diluted to a PTFE content of 35 percent with 134 g. distilled water. 250 g. of this diluted dispersion were mixed with 250 g. of the titanate stock solution of Example 1. This composition was further diluted with 1300 g. of distilled water so that the final dispersion contained about 5% polytetrafluoroethylene solids. A piece of style C heat-cleaned fabric was soaked in this composition so that the loading was about 35.8 g./m.² after drying 4 minutes at 205° C. The MIT flex life (908 g. load) of the glass fabric was 8246 cycles.

EXAMPLE 11

200 g. of an aqueous dispersion of polytetrafluoroethylene (60 percent PTFE) were diluted with 134 g. of distilled water. To 250 g. of this diluted dispersion were added 250 g. of an aqueous solution of titanium lactate made up by diluting 18 g. of a 50 percent aqueous solution of titanium lactate with 282 g. of distilled water. To the resultant dispersion were added 1300 g. of distilled water. Samples of style C heat-cleaned glass fabric were soaked in this dispersion and dried at 205° C. for 4 minutes to give a loading of blend coating on the glass fabric of 26 g./m.² (dry basis) and a MIT flex life (908 g. load) of 11,128 cycles.

EXAMPLE 12

To 200 g. of polytetrafluoroethylene aqueous dispersion (60 percent PTFE) were added 20 g. of a 50 percent aqueous solution of titanium lactate and 2180 g. of distilled water. Style C heat-cleaned glass fabric was soaked in the resultant dispersion and dried at 205° C. for 4 minutes. The MIT flex life (908 g. load) was 14,264 cycles and the loading of the coating on the fabric was 35.8 g./m.².

EXAMPLE 13

To 10.8 pounds of glacial acetic acid were added 5.4 pounds of a solution of 75 percent titanium acetyl acetonate in isopropanol, followed by the addition of 118.8 pounds of distilled water. Next, 135 pounds of polytetrafluoroethylene aqueous dispersion (60 percent PTFE) were added to the solution, followed by the addition of 16.2 pounds of fluorinated acrylate dispersion of Example 8. The concentration of polytetrafluoroethylene in the resultant dispersion was 28.3 percent by weight. Style B heat-cleaned glass fabric was passed through this dispersion (using conventional textile industry equipment) at a speed of 18 yd./min. and then through a wringer operating at a nip load of 4 tons and through an oven heated at 315° C. The resultant loading of dry coating on the fabric was 38.4 g./m.². The MIT flex life (908 g.) of this fabric was 23,457 cycles as compared to 14 cycles for the uncoated glass fabric, 814 cycles for the same glass fabric coated with a commercial graphite-silicone coating, and 677 cycles for the same glass fabric coated with a commercial polytetrafluoroethylene-silicone coating.

EXAMPLE 14

The glass fabric tested in this Example was style C heat-cleaned glass fabric having a MIT flex life of 10 cycles at a load of 908 g. A titanate solution was made up by adding 16 parts of methyl ethyl ketone to 8 parts of a 75 percent solution of titanium acetyl acetonate in isopropanol and by adding dropwise 76 parts of distilled water.

In one experiment, the glass fabric was soaked in the titanate solution (diluted further with $H_2O$ to get the loading described below) followed by passing through a wringer and drying at 260° C. for 5 minutes, to give a loading of titanium oxide polymer of 1.4 g./m.$^2$ and a MIT flex life of 48.

In another experiment, the glass fabric was soaked in an aqueous dispersion of polytetrafluoroethylene diluted sufficiently with water to give a coating loading after drying of about 30 g./m.$^2$. The MIT flex life of this fabric was 2000 cycles.

In still another experiment, 100 g. of the titanate solution was diluted with 300 g. of distilled water and added to 100 g. of an aqueous dispersion of polytetrafluoroethylene (60 percent PTFE). The glass fabric was soaked in the dispersion, passed through a wringer and dried at 260° C. for 5 minutes to give a coating loading of about 30 g./m.$^2$ and a MIT flex life of 9000 cycles which increased to 11,000 cycles after acid exposure. This was a more than five-fold improvement in flex life over the results described in the preceding paragraph in which PTFE was the sole coating on the glass fabric.

In a further experiment, the titanate solution was diluted further with 100 g. of distilled water, and the glass fabric was soaked, passed through a wringer and dried at 260° C. for 5 minutes. This coated glass fabric was then soaked in an aqueous dispersion of polytetrafluoroethylene diluted with distilled water to a PTFE concentration of 12 percent, passed through a wringer and dried at 260° C. for 5 minutes to give a coating loading of about 30 g./m.$^2$. The MIT flex life of the resultant fabric was 10,000 cycles which increased to 24,000 cycles after acid exposure.

In the following Examples 15–18, the glass fabric used was heat cleaned Style A fabric, the glass fabric was submerged in the aqueous dispersion of PTFE for about one minute, the coated glass fabric was passed through a wringer (no pressure) to squeeze off excess liquid, and the coated fabric was dried in an oven at 204° C. for about 4 minutes. The test sample load on the MIT Folding Endurance Tester was 1016 g. and the MIT flex test was run at a constant temperature of 23±1° C. and under a constant relative humidity of 50±5%. Under these conditions, the heat cleaned fabric with no coating has a MIT flex life of fewer than 100 cycles and with a coating of only PTFE, the MIT flex life is about 2200 cycles which falls to only about 160 cycles upon heat aging.

EXAMPLE 15

The PTFE concentration of the aqueous dispersion used in this Example was about 26% by weight and about $\frac{1}{12}$ of the weight of the PTFE present of titanium lactate was added to the dispersion. The fabric sample before coating weighed 17.6 g. and after coating 19.7 g., corresponding to a loading of 24 g./m.$^2$. The MIT flex life of the resultant glass fabric was 3850 cycles.

In another experiment, the titanium lactate concentration was increased until a ratio of about 4:1 PTFE to titanium lactate was present in the dispersion. The MIT flex life of the glass fabric coating with this dispersion was 2036 cycles and after heat aging, 1355 cycles which was a better heat aging performance than obtained for the fabric in the first paragraph.

EXAMPLE 16

To an aqueous dispersion of PTFE was added about 8% based on the weight of PTFE of anhydrous fuming stannic chloride in aqueous solution rendering the PTFE concentration in the resultant dispersion 26% by wt. The glass fabric coated with this composition exhibited a MIT flex life of 1026 cycles before heat aging and 1309 cycles after aging.

EXAMPLE 17

To 26.1 g. of glacial acetic acid was added 13.1 g. of 1.75 molar Zr $(OC_3H_7)_4$ in propanol to give a clear solution. To this solution, 162.7 g. of water was slowly added to form a slightly cloudy mixture to which was added 131.8 g. of aqueous dispersion of PTFE (60% by wt. PTFE in dispersion). The glass fabric weighed 18.5 g. before coating and 20.8 g. after coating, corresponding to a loading of 24 g./m.$^2$. Glass fabric coated with this composition exhibited a MIT flex life of 6700 cycles before heat aging and 854 cycles after heat aging.

EXAMPLE 18

A series of dispersions (26% by weight PTFE) was made up containing increasing amounts of dissolved $NH_2(CH_2)_3Si(OC_2H_5)_3$ silane to give the following results:

| Coating composition | | Flex life-cycles | |
|---|---|---|---|
| Batch No. | Silane conc. (wt. percent based on PTFE) | Loading on fabric (g./m.$^2$) | Before heat aging | After heat aging |
| a | 7 | 25.5 | 1,292 | 1,396 |
| b | 10.4 | 26.0 | 1,240 | 1,814 |
| c | 13.9 | 26.5 | 1,028 | 1,853 |
| d | 17.4 | 25.5 | 1,181 | 926 |
| e | 20.8 | 26.0 | 1,284 | 1,255 |

In actual long-term service tests, filter bags made of glass fabric having a coating of the present invention have performed for longer periods than filter bags coated with a commercial graphite-silicone finish. By way of example, the glass fabric used was type 630, the coating composition had the following composition:

|  | Wt. percent |
|---|---|
| Aqueous solution of titanium lactate (50% solids) | 4.2 |
| Water added | 7.2 |
| PTFE aqueous dispersion (60% PTFE, 3.6% Triton X–100 surfactant-dispersion basis) | 71.5 |
| Fluorinated acrylate dispersion of Example 8 | 17.0 |

The loading of the dried coating on the fabric was about 50 g./m.$^2$. Filter bags made from the coated fabric was exhibited a life of eleven months in a bag house for filtering carbon black from an air stream and the test is still running. By way of comparison, filter bags of glass fabric coated with the commercial graphite-silicone finish have an expected life in this application of about six months.

The following composition has also exhibited long service life in plant tests:

|  | Wt. percent |
|---|---|
| Aqueous solution of titanium lactate (50% solids) | 4.4 |
| Water added | 4.6 |
| PTFE aqueous dispersion (60%, PTFE, 3.6% Triton X–100 surfactant-dispersion basis) | 73.2 |
| Aqueous dispersion of fluorinated acrylate polymer, 6.75% polymer solids | 17.8 |

As many apparently widely different embodiments of this invention may be made without departing from the spirit and scope thereof, it is to be understood that this invention is not limited to the specific embodiments thereof except as defined in the appended claims.

I claim:

1. A dispersion consisting essentially of water, from 2 to 70% of film-forming polytetrafluoroethylene, based on the weight of polytetrafluoroethylene plus water in the dispersion, said dispersion containing from 1 to 70% based on the weight of polytetrafluoroethylene in the dispersion of a water-soluble polyhydrolyzable compound that is not appreciably reactive with water at 25° C., said polyhydrolyzable compound being a monomeric silane containing at least one Si—C bond, or a tetravalent organic titanate, a tetravalent organic zirconate, or a tetravalent organic tin compound, and containing 1–15 percent of an anionic or nonionic surfactant based on the weight of the polytetrafluoroethylene.

2. The dispersion of Claim 1 wherein the polyhydrolyzable compound is a tetravalent organic titanate.

3. The dispersion of Claim 2 wherein the titanate is an acylate of orthotitanic acid.

4. The dispersion of Claim 2 wherein the titanate is titanium lactate.

5. The dispersion of Claim 1 wherein the polyhydrolyzable compound is a silane.

6. The dispersion of Claim 1 containing water-repellent additive.

7. The dispersion of Claim 6 wherein the additive is a fluorinated acrylate polymer.

8. The dispersion of Claim 6 wherein the concentration of said water-repellent additive is from 0.1 to 10% based on the weight of polytetrafluoroethylene in the dispersion.

9. The dispersion of Claim 1 containing a water-repellent additive.

References Cited
UNITED STATES PATENTS

| | | | |
|---|---|---|---|
| 2,592,147 | 4/1952 | Ikeda | 260—29.6 F |
| 3,325,434 | 6/1967 | Tully | 260—29.6 F |

FOREIGN PATENTS

| | | |
|---|---|---|
| 835,465 | 2/1970 | Canada. |

OTHER REFERENCES

MacGregor: Silicones and Their Uses, 1954, p. 223.

HAROLD D. ANDERSON, Primary Examiner

U.S. Cl. X.R.

117—72, 126 GB; 260—29.6 NR, 29.6 MM